Nov. 1, 1932.  C. C. BERTRAM  1,885,173
REVERSING GEAR MECHANISM
Filed July 31, 1920   2 Sheets-Sheet 1
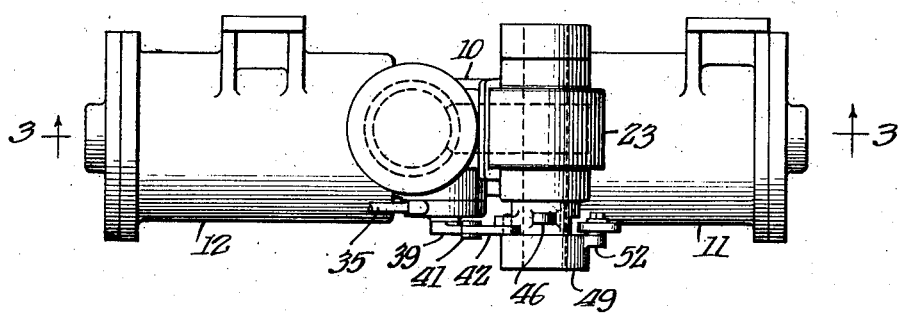
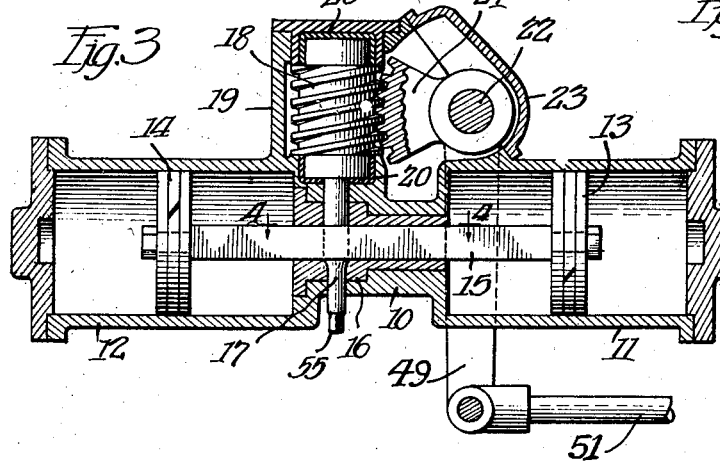
Inventor:
Clarence C. Bertram
By attorney

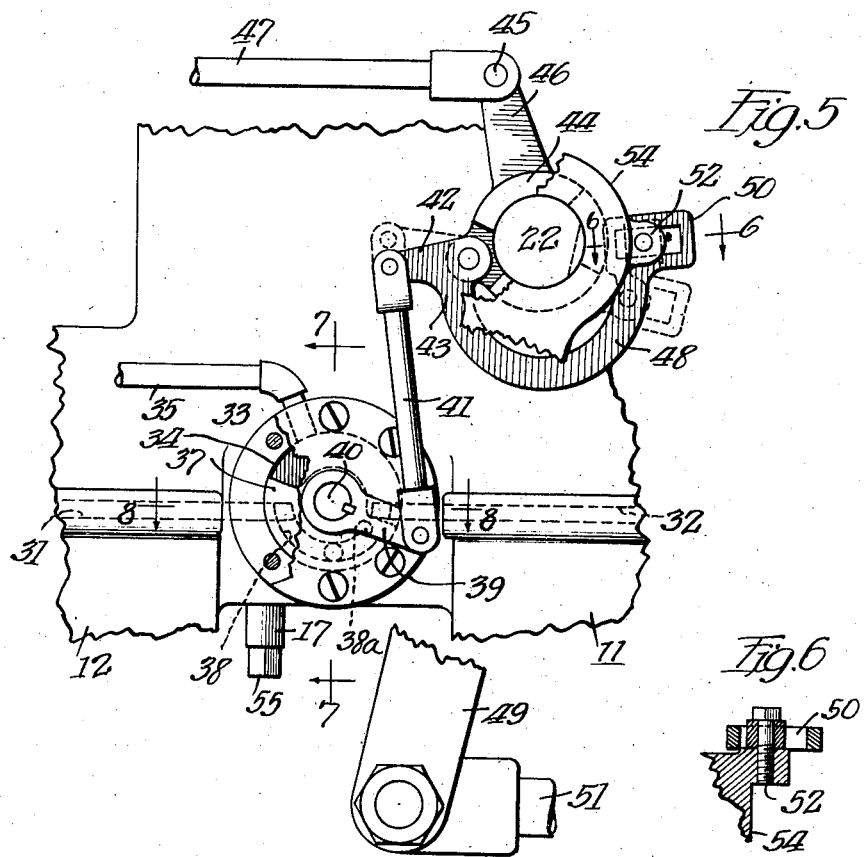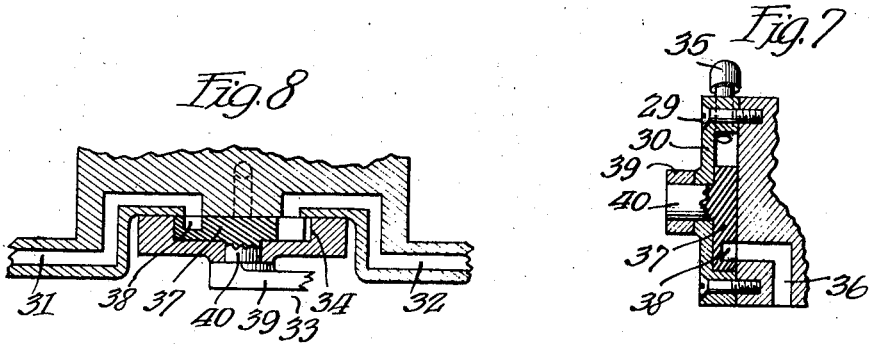

Patented Nov. 1, 1932

1,885,173

UNITED STATES PATENT OFFICE

CLARENCE C. BERTRAM, OF CHICAGO, ILLINOIS, ASSIGNOR TO BARCO MANUFACTURING COMPANY, OF CHICAGO, ILLINOIS, A CORPORATION OF ILLINOIS

REVERSING GEAR MECHANISM

Application filed July 31, 1920. Serial No. 400,503.

The present invention relates in general to reversing gear mechanism and more particularly to mechanism of the character referred to operable by mechanical power, and has special reference to the provision of an improved form of fluid-pressure driven reversing gear mechanism.

The principal objects of the present invention are the provision of an improved form of fluid-operated reversing gear mechanism; the provision of an improved gearing, and more particularly, irreversible gearing, for establishing a driving connection between a suitably driven element and the mechanism to be moved thereby; the provision of an improved valve mechanism for controlling the flow of fluid to the parts to be actuated; the provision in general of an improved arrangement of motion transmitting elements, and more specifically one adapted for operating a controlling valve; the provision in a power driven reversing gear mechanism of means whereby the mechanism may be actuated manually from an external point in the defect of power actuation; together with such further and additional objects as may be below set forth.

Mechanisms of the character referred to have a general field of usefulness, and are of particular utility in the operation of the valve mechanism of large steam engines.

For purposes of illustration, therefore, the inventions have been shown structurally embodied in form adapted for employment as gearing for opening and closing, and for reversing, the valve mechanism of railway locomotive engines.

In the accompanying drawings, therefore,—

Figures 1 and 2 are respectively a longitudinal elevational view, and a top plan view, of the casings of the improved mechanisms, together with the associated elements extending respectively to the engineer's cab and to the tumbling shaft of the locomotive;

Figure 3 is a longitudinal sectional view, taken substantially centrally of the device of Figure 2, on the line 3—3 thereof;

Figure 4 is a plan view, partly in section, taken on line 4—4 of Figure 3 illustrative of certain elements indicated in side elevation in Figure 3;

Figure 5 is an enlarged fragmentary elevational view, partly in section, of certain details of the construction of Figure 1, illustrative of other relations assumed by certain of the parts; and Figures 6, 7 and 8 are fragmentary sectional views illustrative of details of construction and arrangements of ports and passages, such views being taken on lines 6—6, 7—7, and 8—8 of Figure 5.

Referring first to Figures 1 to 3 of the drawings, it will be observed that in the present invention there is provided a casing structure 10, having cylinder portions 11, 12, within which is mounted a piston structure including heads 13, 14, connected by a rod 15. The casing 10 is preferably made integral with the cylinder portions in alignment and is provided with an integral lateral extension to form a housing, 19, for certain gear elements hereinafter to be described.

The rod 15 is non-circular and is supported in the casing 10 by means of a step-bearing 16, which also serves as a bearing for the reduced shaft 17 of the worm 18 mounted in said housing 19.

The worm is held in position in the housing 19 and against longitudinal movement by means of bushing, 20, and is in mesh with a segmental worm gear 21 carried on a shaft 22, in a housing 23.

Reverting to the shaft 17 and the rod 15, these two elements have a rack-and-pinion engagement, (see Figure 4), and clearly the length of the rack on the rod 15 and the relationship of the number of teeth on the rack to those on the pinion is such that the full throw of the rack-rod 15 will cause a number of revolutions of the worm 18.

As a result of the plurality of revolutions thus given to the worm the convolutions of the spiral thread thereof may be made closer together and a more efficient locking effect and greater strength afforded by increasing the area of engagement between the worm thread and teeth of the segment 21 without decreasing the angular throw of the latter.

As means for the operation of the piston structure there are formed within the casing the passages 31 and 32 for the purposes of admitting and exhausting fluid under pressure to and from the opposite ends of the cylinders 11 and 12. This admission and exhaustion of fluid is controlled by a valve mechanism shown generally at 33 in Figures 5 and 8.

The said controlling valve structure comprises a valve chamber 34 with which the passages 31 and 32 communicate. This valve chamber is formed by securing a cup-shaped block 30 to the casing 10 by means of screws 29 (see Figure 7).

Fluid under pressure is introduced into the chamber 34 by means of a pipe 35 connected to a suitable source of supply (not shown) and controlled by a cab-valve under the hand of the engineer. From the chamber 34 exhausted fluid is vented to the atmosphere at the point indicated at 36 (Figure 7).

For establishing the desired communications between the various passages and ports, there is employed a suitable valve disposed in the chamber 34. This valve is conveniently one of the rotating segmental disc type 37 provided with a segmental groove 38.

It will be apparent upon viewing Figure 5 of the drawings that the contour of the disc 37 is such that the orifices of both of the passages 31 and 32 are covered in one position of the disc 37, hereinafter referred to as "lap" position and whenever the disc 37 is moved in either direction from such lap position, the groove 38 will bring one of the passages 31, 32 into register with the passage leading to the exhaust port 36 (see Figure 7), and at the same time uncover the orifice of the other of such passages and permit the influx of fluid under pressure, thus insuring at all times an equilibrium of pressure against the several piston heads and permitting the valve gear to be set at any desired cut-off and held against creeping. It will be readily seen that all of the desired functions of the controlling valve mechanism are accomplished by the use of but a single moving valve member.

As means for operating the valve mechanism, that is, for turning the disc 37 to any desired extent, there is employed a link, 39, fixed on the stem 40 of the valve 37. Such link is pivotally connected by a rod 41 to one arm 42 of a bell-crank lever, 43, in turn pivoted to an annulus, 44, surrounding the shaft 22. The so-called "short reach rod" 47 is pivotally connected as indicated at 45 to the arm 46 extending from the annulus 44.

From the foregoing description, it will be understood that by manipulation of this lever and thereby movement of the "short reach rod" 47, the engineer can move the disc 37 into any desired position, and thereby not only impart such forward or reverse movement to the locomotive as may be desired, but also set and hold the valve gear at any desired cut-off.

For the purpose of restoring the valve 37 from any off-lap position to lap position, after imparting the necessary movement to the piston rod 15 and associated parts and thereby holding the valve gear at the desired cut-off, the arm 48 of the bell-crank lever 43 has a lost motion connection by the pin and slot arrangement 50 with the lug 52 projecting from the annular portion 54 of the lever 49 pivotally connected at its lower end to the so-called "long reach rod" 51 as is clearly to be seen on inspection of Figure 5.

As is obvious on viewing Figures 3 and 5 when the valve 37 is moved to an off-lap position, as for example as shown in Figure 5 where the left-hand end of the groove 38 is in communication with the passage 31 and the right-hand end of such groove terminates at the point indicated at 38a, the shaft will be oscillated as hereinbefore clearly set forth and will in turn actuate the "long reach rod" 51 through the lever 49.

This movement of the lever 49 will in turn actuate the bell-crank lever, 43, through the pin and slot connection 50 and move said lever 43 to the position indicated in dotted lines in Figure 5, thus restoring the valve 37 to lap position.

Inasmuch as at times circumstances may arise, owing to breakage or stoppage of one of the fluid conducting lines or passages or failure of fluid supply, or the piston structure may for other reasons become inoperable by fluid pressure, which may render it desirable to operate the piston structure manually in order to set the valve gear in a predetermined position, I extend the shaft 17 through and beyond the casing 10 and provide it with a squared terminal 55 adapted for the application of any suitable means, such as a wrench, whereby it may be rotated manually or by any available mechanism.

Having thus described my invention and illustrated its use, what I claim as new and desire to secure by Letters Patent is—

1. In a mechanism for operating valve gears, the combination of a cylinder and a piston operable therein, a rack bar extending from said cylinder, a worm having a gear toothed extension lying on an axis at substantially right angles to and meshing with said rack bar, a removable end bearing for said worm permitting bodily removal of the worm and toothed extension without material disturbances of the other elements, and a segmental gear mounted in bearings on said cylinder and meshing with said worm to form an irreversible connection and adapted to be connected to a valve gear.

2. In a mechanism for operating valve gears, a pair of opposed cylinders connected at their ends by an intermediate casing structure, a pair of pistons in said cylinders connected for simultaneous movement by a piston rod extending through said casing, a rack formed on said piston rod, a bearing member in said casing for said rack, a pinion at right angles to said piston rod in operative engagement with said rack and carried by a shaft revolubly supported in said casing and in said bearing member, a worm on said shaft, and a worm gear in engagement with said worm, said bearing being retained in position by said shaft.

3. In a mechanism for operating valve gears, a pair of opposed cylinders connected at their ends by an intermediate casing structure, a pair of pistons in said cylinders connected for simultaneous movement by a piston rod extending through said casing, a rack formed on said piston rod, a bearing member in said casing for said rack, a pinion at right angles to said piston rod in operative engagement with said rack and carried by a shaft revolubly supported in said casing and in said bearing member, said casing having a laterally extending housing, a worm revoluble with said shaft and arranged on bearings in said housing, and a worm gear in engagement with said worm, and connected to an element to be moved.

4. In a mechanism for operating valve gears, the combination of a pair of cylinders and pistons operating therein, a casing structure arranged between and having a portion lying at an angle to said cylinders, a rack bar connecting the pistons projecting through said casing structure, a worm operating in the angularly disposed portion of said casing on an axis at an angle to said rack bar and having a toothed extension meshing with said bar to be rotated thereby, a common bearing member in said casing bearings in said bearing member for said rack bar and worm and extension, a lateral extension of said casing at one side of and adjacent to said worm, and a segmental gear mounted in said casing extension for rotation by and meshing with said worm on an axis at an angle thereto, said segmental gear being adapted for connection to an element to be moved.

5. In a mechanism for operating valve gears, the combination of a pair of cylinders and pistons operating therein, a casing structure arranged between and having a portion lying at an angle to said cylinder, a rack bar connecting the pistons projecting through a part of said casing structure, a worm operating in said casing on an axis at an angle to said rack bar and having a toothed extension meshing with said bar to be rotated thereby, bearings in said casing for said rack bar and worm and extension, one of said bearings being common to said rack bar and toothed extension, and retained in position thereby, a lateral extension of said casing at one side of and adjacent to said worm, and a segmental gear mounted in said casing extension for rotation by and meshing with said worm on an axis at an angle thereto, said segmental gear being adapted for connection to an element to be moved.

6. In a mechanism for operating valve gears, the combination of a toothed segment for operating the gear mechanism, and means for operating said segment comprising a pair of cylinders, pistons mounted therein for reciprocation and a member engaged thereby, said second member having a close-pitched thread thereon engaging said segment, said reciprocating member having a longitudinal rack thereon arranged when given a full throw to give said spiral member a plurality of rotations whereby a high speed of rotation and a short throw operation of the spiral member are obtained and whereby the irreversibility of the gearing is assured.

7. In a device of the character described, in combination, a cylinder casing structure and pistons reciprocable therein having a rack bar, a worm casing structure and a worm rotatable therein on a shaft at substantially right angles and geared to said rack bar, and a common bearing for said shaft and rack bar removably mounted in said cylinder structure and normally retained against displacement by shaft.

8. In a mechanism for operating a valve gear, the combination of a pair of cylinders, pistons operating in said cylinders, a toothed piston rod, a segmental gear adapted for connection to the valve gear, and an intermediate rotatable worm engaging said segmental gear and having an integral pinion connecting with said piston rod, said worm and pinion being removable as a unit along the axis thereof.

In testimony whereof I have hereunto signed my name.

CLARENCE C. BERTRAM.